March 1, 1932.  H. MAYER  1,847,127

ELECTRICAL TESTING SYSTEM

Filed Nov. 8, 1928

INVENTOR
HANS MAYER
BY
ATTORNEY

Patented Mar. 1, 1932

1,847,127

UNITED STATES PATENT OFFICE

HANS MAYER, OF BERLIN, GERMANY, ASSIGNOR TO SIEMENS & HALSKE AKTIEN-GESELLSCHAFT, OF SIEMENSSTADT, NEAR BERLIN, GERMANY, A COMPANY OF GERMANY

ELECTRICAL TESTING SYSTEM

Application filed November 8, 1928, Serial No. 317,891, and in Germany November 24, 1927.

The invention relates to improvements in measuring bridges for measuring impedances. In many measuring bridges, an ohmic resistance and the impedance to be measured are connected to the source of measuring current, while by means of three resistances and a reactance, a point is established, which has the same potential as the common terminal of the impedance to be measured and of the first mentioned resistance. The ohmic resistance and the impedance to be measured may then be calculated from the adjusted values of the resistances and of the reactive arm. Still other forms of this bridge are known, which differ from the above mentioned insofar as the connections of the source of current and of the measuring instrument are changed, which of course is possible in any measuring bridge.

According to the invention, the determination of the impedance of any electric circuit, can be made directly with respect to phase and amplitude by the setting of two resistances. This is accomplished by adding another resistance to the measuring bridge, which has the same value as the resistances already present and is so connected, that the two equal resistances lie symmetrical with respect to the two opposite corners of the bridge, between which the impedance to be measured is situated in series with an ohmic resistance. These two corner points also have the source of current or the measuring instrument connected to them.

Figure 1:
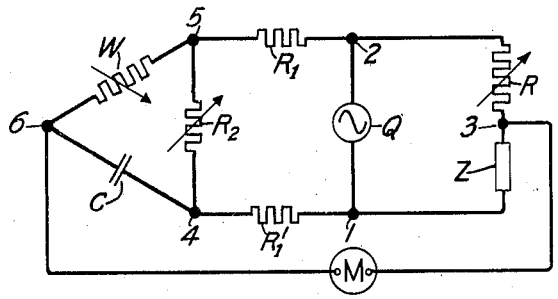
Figure 3:
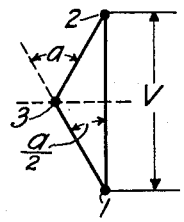
Figure 2:
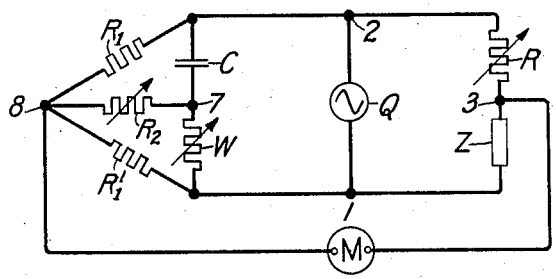
Figure 4:
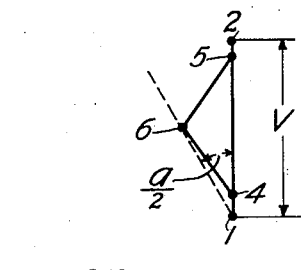
Figure 5:
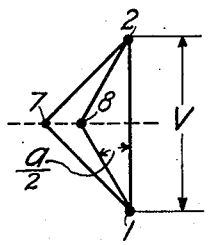
Figure 6:
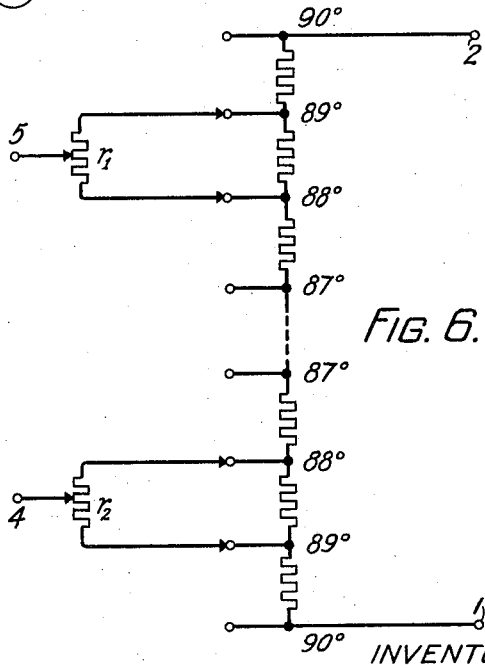

The invention will be better understood by reference to the following description and accompanying drawings, in which Figs. 1 and 2 are different embodiments of the invention, Figs. 3 and 4 are vector diagrams of the voltage relations of the impedance elements of Fig. 1, Fig. 5 is a voltage diagram of some of the impedance elements of Fig. 2 and Fig. 6 is a modification of Fig. 1.

The drawings show two forms of the invention by way of example. In Fig. 1, Q is the source of current, to whose terminals are connected in series the impedance to be measured Z and a resistance R. Passing from the source of current two mutually equal resistances $R_1$ and $R_1'$ are connected together by a resistance $R_2$ in parallel to which is a series circuit of a resistance W and a capacity C. It should be mentioned that the capacity C might also be replaced by any impedance of known construction and having a considerable phase angle, for instance a coil. As a rule, however, the use of a condenser is to be preferred.

The common terminals of W and C and of R and Z are connected to the zero reading meter M. In measuring with this bridge, the resistance W or the condenser C is so adjusted, that the impedance of the condenser assumes the value W at the measuring frequency. Thus the resistance or the condenser may be suitably calibrated directly with regard to frequency. When this is done, the zero reading meter may be made wattless, if the resistance R is made equal to the value of the impedance to be measured Z and the resistance $R_2$ is properly adjusted. When the resistance $R_2$ is small with respect to twice the value of W, the setting of the resistance $R_2$ depends upon the phase angle of the impedance Z. This is more fully explained in connection with Figs. 3 and 4.

Fig. 3 shows how the voltage V of the source Q is divided through the resistance R and the impedance Z. As the impedance values of R and Z are equal, the voltage V, whose terminal points are denoted by 1 and 2, must be divided into two potentials having the same value. The point of division 3, will thus lie on the center line of the distance 1, 2 shown in dotted lines. The two component voltages 1, 3 and 3, 2 form an angle with respect to each other, the supplement of which is the angle $a$. The angle $a$ is equal to the angle of the impedance Z. The voltage 1, 3 thus forms with the voltage 1, 2 the angle $a_2$. Referring to Fig. 4 the other portion of the circuit may be regarded as a potentiometer having the three ohmic resistances $R_1$, $R_2$ and $R_1'$ in series with each other, as it is assumed that $R_2$ is sufficiently small with respect to the impedance of the parallel elements W and C. The component voltages 1, 4, 4, 5 and 5, 2 will be in the ratio of the resistances $R_1$, $R_2$ and $R_1'$, i. e. the points 4 and 5 by varying the resistance $R_2$ will be shifted between the points 1 and 2, but will remain permanently symmetrical to the mid-point of the points 1 and 2. The voltage lying between the points 4 and 5, is divided between the resistance W and the impedance of the condenser C. Thus if it is assumed that the condenser C has a negligible angle of loss, the two partial voltages 4, 6 and 6, 5 will be perpendicular to each other. As the values of the two impedances are made equal, the point 6 will likewise move on the mid-horizontal of the line 1, 2 so that the point 6 may be brought to the same potential as point 3 of Fig. 3. With the aid of Figs. 3 and 4 it will be seen, that the amount of the impedance Z can be ascertained by the reading of the resistance R and the phase angle determined by the reading of $R_2$. Thus these resistances R and $R_2$ may be calibrated the former according to impedance magnitude and the latter according to phase angle.

Instead of varying the resistance $R_2$ alone, as indicated in Fig. 1, $R_1$, $R_2$ and $R_1'$ may be formed as a fixed resistance on which the points of contact 4 and 5 may be varied. As shown in Fig. 6 for example, a step switch may be arranged with the aid of which the two contact points 4 and 5 may be advanced simultaneously and the various resistances so proportioned that a variation of the angle by a fixed amount, say 1°, corresponds to each switching step.

If the graduation from degree to degree is not sufficient, a more minute reading is obtainable by bridging over two adjacent contacts, e. g. 88° and 89° in Fig. 6, with a resistance $r_1$ or $r_2$ and tapping off the points 4 and 5 from these resistances. The phase angle may then be even determined accurately to fractions of a degree.

Another form is shown in Fig. 2. The source of current, the zero instrument, the resistance R and the impedance Z are arranged in the same manner as in Fig. 1. The condenser C and the resistance W are connected in series to the terminals 1 and 2. The three terminals of these two circuit elements are connected through the resistances $R_1$, $R_2$, $R_1'$ to the apex 8 of the bridge to which the zero instrument is also connected. In this case also the resistances $R_1$ and $R_1'$ are equal to each other.

The voltage diagram for the impedances R and Z is as shown in Fig. 3 but the voltage distribution for the other circuit elements is as shown by Fig. 5. The voltage V between the points 1 and 2 is divided between the condenser C and the resistance W, that is the component voltages 1, 7 and 7, 2 are perpendicular to each other, assuming that the resistance $R_2$ is great with respect to the resistance W, and the condenser has a negligible angle of loss. The point 7 will thus form the apex of an isosceles right-angled triangle over the hypothenuse 1, 2 when the value of the impedance of the condenser is equal to the value W. The potential of the point 8 is given as a zero point of the star-connected voltages at the resistances $R_1$, $R_2$ and $R_1'$ and the point 8 will also move along the middle horizontal of the line 1, 2 because $R_1$ and $R_1'$ are equal to each other. Thus also in this circuit, the points 3 and 8 may be made equal, so that the meter reads zero and then R represents the value of the impedance Z and $R_2$ represents the phase angle of the impedance Z.

The examples relate to the measurement of impedances with positive phase angles. For measuring impedances with negative phase angles, it is sufficient either to interchange R with Z or W with C. It will be seen from the phase angle that another circuit may be used in place of the condenser, if the phase angle of the impedance of this circuit is equal or greater than the phase angle of the impedance to be measured. If the condenser is replaced by a coil having a positive phase angle, the coil must be put in the place of the resistance W and the resistance W in place of the condenser C.

Although for the purposes of explaining the invention, it has been described in connection with certain specific circuit arrangements, the principles involved are capable of general application to arrangements not specifically described but which will readily occur to persons skilled in the art which are included within the scope of the appended claims.

What is claimed is:

1. In an impedance measuring instrument comprising a bridge circuit, one arm of which comprises an impedance to be measured, a second arm comprising an adjustable resistance, one terminal of said resistance to be measured and one terminal of said adjustable resistance connected together, the other terminal of said impedance to be measured and said adjustable resistance connected to opposite terminals of said bridge circuit, each of said opposite bridge terminals having one terminal of another resistance connected thereto, said last mentioned resistances being of equal magnitude and connected to a three-element network, the values of which network may be relatively proportioned so as to determine the phase shift in the current through said impedance to be measured at the frequency supplied to said bridge.

2. An impedance measuring instrument in accordance with claim 1, characterized in this, that said three-element network comprises two resistances and a capacity.

3. An impedance measuring instrument in accordance with claim 1, characterized in this, that said three-element network comprises two resistances and a reactance.

4. An impedance measuring instrument in accordance with claim 1, characterized in this, that the variable elements of said bridge circuit are calibrated to indicate the phase shift of the impedance directly.

5. In a four-arm measuring bridge including two equal resistance arms, a third or variable arm comprising a variable resistance, an unknown impedance as the fourth arm, an indicator connected between the first and second arms and third and fourth arms respectively, a multiple arm phase adjusting network connected to the two equal resistance arms and the indicator and cooperating with said resistance arms to produce a point of potential at their connection to the indicator, of the same magnitude and phase as the potential at the junction point of the impedance to be measured and the variable arm.

6. An impedance measuring instrument in accordance with claim 5, characterized in this, that said phase adjusting network comprises two resistances and a reactance.

7. An impedance measuring instrument in accordance with claim 5, characterized in this, that said phase adjusting network comprises two resistances and a capacity.

In witness whereof, I hereunto subscribe my name this 1st day of October, 1928.

HANS MAYER.